US009115772B2

(12) United States Patent
Dix et al.

(10) Patent No.: US 9,115,772 B2
(45) Date of Patent: Aug. 25, 2015

(54) SYSTEM AND METHOD FOR AUTOMATICALLY CALIBRATING THE CLUTCHES WITHIN A TRANSMISSION OF A WORK VEHICLE

(71) Applicants: Peter J. Dix, Naperville, IL (US); Pawel Kuros, Wood Dale, IL (US)

(72) Inventors: Peter J. Dix, Naperville, IL (US); Pawel Kuros, Wood Dale, IL (US)

(73) Assignee: CNH Industrial America LLC, New Holland, PA (US)

( * ) Notice: Subject to any disclaimer, the term of this patent is extended or adjusted under 35 U.S.C. 154(b) by 87 days.

(21) Appl. No.: 14/041,825

(22) Filed: Sep. 30, 2013

(65) Prior Publication Data
US 2015/0094922 A1 Apr. 2, 2015

(51) Int. Cl.
*F16D 48/06* (2006.01)

(52) U.S. Cl.
CPC ...................... *F16D 48/06* (2013.01)

(58) Field of Classification Search
CPC . F16D 25/126; F16D 25/0638; F16D 25/086; F16D 25/14; F16D 2048/0224; F16D 48/06; F16D 48/062; B60W 10/02; B60W 2710/022; B60W 2510/0225; B60W 2510/0275; Y10T 477/75; Y10T 477/78
See application file for complete search history.

(56) References Cited

U.S. PATENT DOCUMENTS

| 5,012,416 | A | 4/1991 | Bulgrien et al. |
| 5,224,577 | A | 7/1993 | Falck et al. |
| 5,337,871 | A | 8/1994 | Testerman |
| 5,337,874 | A * | 8/1994 | Oltean et al. ............. 192/70.252 |
| 5,454,767 | A | 10/1995 | Clausen et al. |
| 5,624,350 | A | 4/1997 | Bates |
| 5,626,534 | A | 5/1997 | Ashley et al. |
| 5,737,979 | A | 4/1998 | McKenzie et al. |
| 5,842,375 | A * | 12/1998 | Reeves et al. ................... 74/335 |
| 5,853,076 | A | 12/1998 | McKee et al. |
| 6,023,988 | A | 2/2000 | McKee et al. |
| 6,119,072 | A | 9/2000 | Eastman |
| 6,341,552 | B1 | 1/2002 | Potter et al. |
| 6,965,822 | B2 | 11/2005 | Brome et al. |
| 7,731,630 | B2 | 6/2010 | League et al. |
| 8,050,835 | B2 | 11/2011 | Wilson et al. |
| 8,086,329 | B2 | 12/2011 | Keefover et al. |
| 8,475,335 | B2 | 7/2013 | Lochocki, Jr. et al. |
| 2002/0183165 | A1 | 12/2002 | Mack et al. |
| 2012/0158264 | A1 | 6/2012 | Kuras et al. |

FOREIGN PATENT DOCUMENTS

WO WO 2013/029058 A1 2/2013

OTHER PUBLICATIONS

Transmission, AutoPowr—Deere.com / Tractor NA Transmissions 2012.

* cited by examiner

*Primary Examiner* — Edwin A Young
(74) *Attorney, Agent, or Firm* — Sue C. Watson (57) ABSTRACT

In one aspect, a computer-implemented method for automatically calibrating clutches within a transmission of a work vehicle may include determining, with a computing device, whether a plurality of predetermined conditions are satisfied for performing a clutch calibration on a clutch of the transmission. The predetermined conditions may require that the work vehicle be in park and that a predetermined time period has elapsed since a previous clutch calibration was performed on the clutch. In addition, the method may include automatically initiating the clutch calibration without requiring operator input when the predetermined conditions are satisfied and performing the clutch calibration in order to calibrate the clutch.

15 Claims, 5 Drawing Sheets

SYSTEM AND METHOD FOR AUTOMATICALLY CALIBRATING THE CLUTCHES WITHIN A TRANSMISSION OF A WORK VEHICLE

FIELD OF THE INVENTION

The present subject matter relates generally to the calibration of clutches within work vehicle transmissions and, more particularly, to a system and method for automatically calibrating the clutches within a continuously variable transmission of a work vehicle.

BACKGROUND OF THE INVENTION

Transmissions with hydraulically operated clutches (e.g., power shift transmissions and continuously variable transmissions) are well known in the art. When operating such transmissions, it is important to accurately control clutch engagement in order to provide the desired vehicle performance. However, due to tolerances within the clutch valve and errors associated with the controller's ability to command the correct current, the pressure needed to move the clutch's actuator (e.g., a hydraulically actuated piston) to the point at which the clutch plates touch and the clutch begins to transmit torque can vary significantly. As a result, it is often necessary to calibrate transmission clutches to ensure that the proper clutch pressures are being supplied for engaging each clutch.

Conventional techniques for calibrating transmission clutches typically require some type of special tooling and/or special training. As a result, clutch calibrations are often required to be performed by specialized service technicians, resulting in a substantial increase in the overall maintenance costs for a work vehicle. Accordingly, a need exists for a calibration methodology that may be automatically implemented by a vehicle's controller, thereby minimizing the need for expensive service-initiated clutch calibrations. Additionally, when implementing such an automatic calibration method, it may desirable for the clutch calibration to be performed in a manner that minimizes the amount of operator interactions required as well as minimizes operator inconvenience.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a computer-implemented method for automatically calibrating clutches within a transmission of a work vehicle. The method may include determining, with a computing device, whether a plurality of predetermined conditions have been satisfied for performing a clutch calibration on a clutch of the transmission. The predetermined conditions may require that the work vehicle be in park and that a predetermined time period has elapsed since a previous clutch calibration was performed on the clutch. In addition, the method may include automatically initiating the clutch calibration without requiring operator input when the predetermined conditions are satisfied and performing the clutch calibration in order to calibrate the clutch.

In another aspect, the present subject matter is directed to a computer-implemented method for automatically calibrating clutches within a continuously variable transmission of a work vehicle. The method may include determining, with a computing device, whether a plurality of predetermined conditions have been satisfied for performing a clutch calibration on a clutch of the transmission. The predetermined conditions may require that the work vehicle be in park and that a predetermined time period has elapsed since a previous clutch calibration was performed on the clutch. The predetermine period may correspond to a predetermined amount of engine hours of the work vehicle. In addition, the method may include automatically initiating the clutch calibration without requiring operator input when the predetermined conditions are satisfied and performing the clutch calibration in order to calibrate the clutch.

In a further aspect, the present subject matter is directed to a system for automatically calibrating work vehicle clutches. The system may include a transmission having a clutch and a clutch valve associated with the clutch. The clutch valve may be configured to regulate a clutch pressure of the fluid supplied to an actuator of the clutch. The actuator may be configured to engage the clutch based on the clutch pressure. In addition, the system may include a controller commutatively coupled to the clutch valve. The controller may be configured to determine whether a plurality of predetermined conditions have been satisfied for performing a clutch calibration on the clutch. The predetermined conditions may require that the work vehicle be in park and that a predetermined time period has elapsed since a previous clutch calibration was performed on the clutch. In addition, the controller may be configured to automatically initiate the clutch calibration without requiring operator input when the plurality of predetermined conditions are satisfied and actually perform the clutch calibration in order to calibrate the clutch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for automatically calibrating the clutches within a transmission of a work vehicle. Specifically, in several embodiments, the clutch calibration may be automatically initiated (i.e., without requiring any operator input or interaction) when one or more predetermined conditions are satisfied. For instance, predetermined conditions for initiating the calibration may include, but are not limited to, requiring that the vehicle be in park, requiring that a predetermined time period has elapsed since the last clutch calibration was performed, requiring that the engine speed and/or one or more fluid temperature(s) fall within a predetermined range(s), requiring that any powered implements be turned off and/or any other suitable conditions. Assuming the appropriate condition(s) is/are satisfied, the calibration process may be initiated to calibrate one or more of the transmission clutches. During such process, the operator may be notified that an automatic clutch calibration is underway via a message window in the cab display or via any other suitable notification means.

It should be appreciated that, since the vehicle is required to be maintained in park for the duration of the calibration process, it may be desirable for the clutch calibration to be performed during a time period within which the operator would otherwise keep the vehicle running while in park. For instance, with some work vehicles, it is recommended to maintain the vehicle running while in park for a given time period to allow the vehicle's turbo to cool down prior to complete vehicle shutdown. In such instance, the automatic clutch calibration disclosed herein may be performed during such time period to allow the transmission to be calibrated without requiring additional vehicle operation time.

Additionally, since the clutch calibration is initiated automatically instead of being triggered by the operator, the vehicle controller may be configured to automatically abort or cancel the calibration process if one or more cancellation conditions are satisfied. For instance, the calibration process may be automatically cancelled if the operator moves the FRNP lever out of park or manipulates one or more other control levers or pedals of the work vehicle (e.g., the speed control lever or pedal, the clutch pedal, the engine throttle lever, the neutral button and/or any other suitable input device). In addition, the calibration process may be cancelled if the controller detects any vehicle movement or vehicle movement beyond a given threshold. By providing such cancellation conditions, the clutch calibration process may be automatically cancelled if the operator needs to immediately use the vehicle or if the operator simply decides that he/she does not desire for the clutch calibration to be performed at that time.

Moreover, during the calibration process, various limitations may be implemented in order to reduce the total amount of time required to complete the calibration as well to prevent the occurrence of abnormal conditions that may significantly impact the performance of the vehicle. For example, in several embodiments, only a portion of the clutches may be calibrated when performing the disclosed automatic clutch calibration (e.g., by only calibrating the forward, reverse and first range clutches). In addition, a step size limitation may be utilized to limit the incremental current change that the controller is allowed to make between each successive current command during the calibration process. Moreover, a maximum change limitation may be utilized to limit the total current change that the controller is allowed to make between the initial current command and the final current command. By providing such limitations, the calibration process may be completed relatively quickly without substantially changing vehicle performance.

Figure 1:
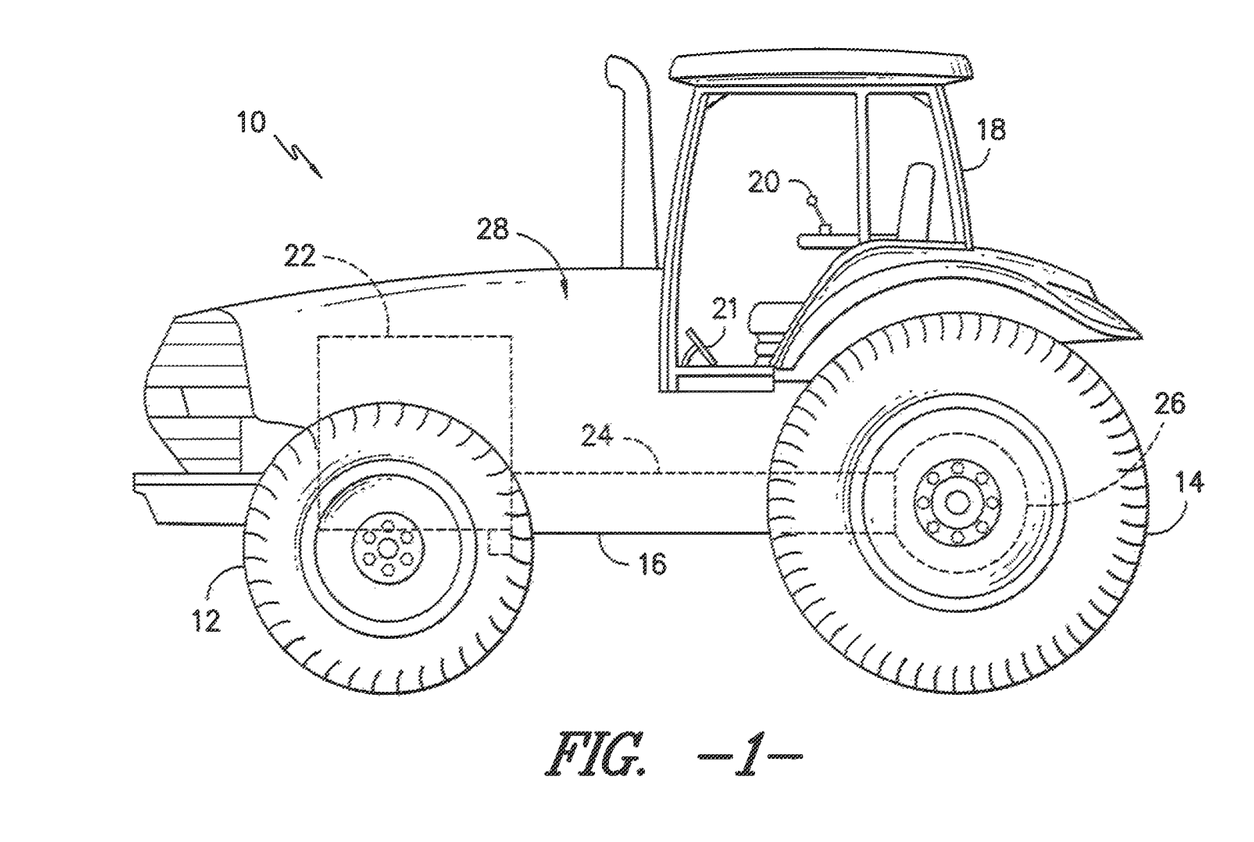
FIG. 1 illustrates side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21 (e.g., levers, pedals, control panels, buttons and/or the like) for permitting an operator to control the operation of the work vehicle 10. For instance, as shown in FIG. 1, the work vehicle 10 may include a Forward-Neutral-Reverse-Park (FNRP) lever 20 and a clutch pedal 21. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via an axle/differential 26. The engine 22, transmission 24, and axle/differential 26 may collectively define a drive train 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
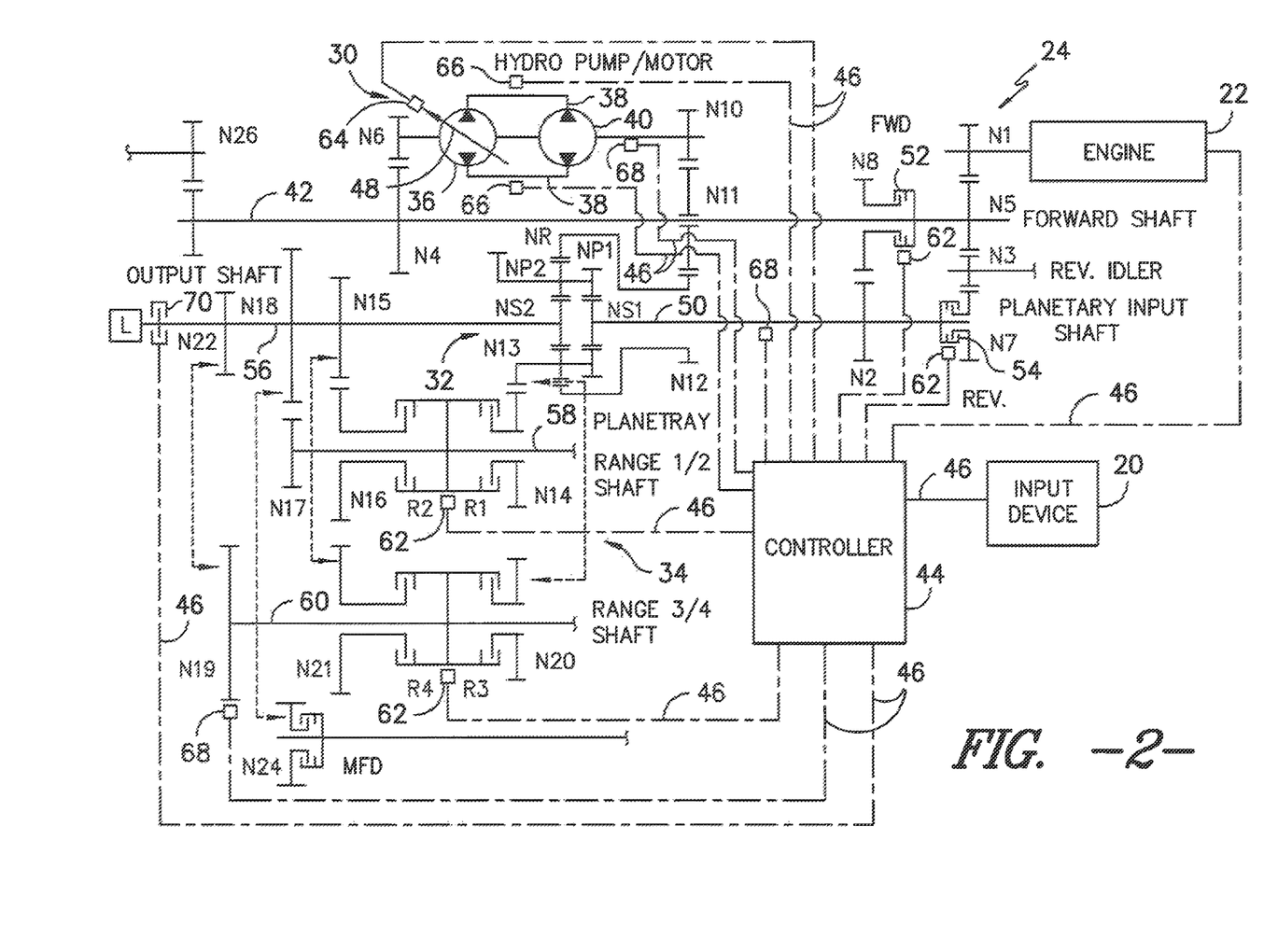
FIG. 2 illustrates a schematic view of one embodiment of a continuously variable transmission suitable for use within the work vehicle shown in FIG. 1.

Referring now to FIG. 2, a schematic diagram of one embodiment of a continuously variable transmission 24 suitable for use with the work vehicle 10 described above is illustrated in accordance with aspects of the present subject matter. As shown, the transmission 24 may include a hydrostatic power unit 30 and a planetary power unit 32. The hydrostatic power unit 30 and the planetary power unit 32 may be coupled to a driveline including a range gear set 34 and may also be coupled to a load L. For example, in one embodiment, the load L may correspond to the drive wheels of the work vehicle 10 (e.g., the front and/or rear wheels 12, 14 of the work vehicle 10). Alternatively, the hydrostatic power unit 30 and the planetary power unit 32 may be coupled to any other suitable load L, such as loads that include a track drive or a separate operating system of the work vehicle 10 (e.g., a front and/or rear power take off (PTO) of the vehicle 10).

The hydrostatic power unit 30 of the transmission 10 may generally include a fluid pump 36 coupled by fluid conduits 38 in a closed loop to a fluid motor 40. The motor 40 may be coupled to the engine 22 via an input gear N6. Specifically, as shown in FIG. 2, power may be transmitted to the hydrostatic power unit 30 by a driven gear N4 mounted on a forward shaft 42 of the transmission 10 and engaged with the input gear N6. In addition, an output gear N10 for the hydrostatic power unit 30 may be connected to a ring gear NR of the planetary power unit 32 via gears N11 and N12.

In general, the pump 36 may comprise any suitable electronically controlled pump known in the art, such as an electronically controlled variable displacement hydraulic pump. As such, operation of the pump 36 may be automatically controlled using an electronic controller 44 of the work machine 10. For example, as shown in FIG. 2, the controller 44 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

It should be appreciated the controller 44 may generally comprise any suitable processor-based device known in the art. Thus, in several embodiments, the controller 44 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 44 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 44 to perform various computer-implemented functions, such as the methods 100, 200 described below with reference to FIGS. 4 and 5. In addition, the controller 44 may also include various other suitable components, such as a communications circuit or module, one or more input/output channels, a data/control bus and/or the like.

Referring still to FIG. 2, the planetary power unit 32 of the transmission 24 may generally include a primary sun gear NS1 mounted on a planetary input shaft 50. As shown, the planetary input shaft 50 may be coupled to the engine 22 via a forward directional clutch 52 or a reverse directional clutch 54. In addition, the planetary power unit 32 may be configured to be selectively coupled to the load L, coupled to the hydrostatic power unit 30 and selectively coupled to the engine 22, all under automatic control of the controller 44. For example, for coupling the planetary power unit 32 to the load L, the transmission 24 may include an output shaft 56 coupled to the load L which carries an input gear N18 engaged with an output gear N17 on a range ½ shaft 58 of the range gear set 34 and a gear N22 engaged with a gear N19 on a range ¾ shaft 60 of the range gear set 34. The range ½ shaft 58 may, in turn, be coupled to the planetary power unit 32 via automatic operation of range selectors or clutches R1 and R2 for power flow through gears N13 and N14, or N15 and N16, respectively. Similarly, the range ¾ shaft 60 may be coupled to the planetary power unit 32 via range selectors or clutches R3 and R4 for power flow via gears N13 and N20, or N15 and N21, respectively. The range ½ and ¾ shafts 58, 60 may also be simultaneously coupled to the planetary power unit 32 to provide dual power flow. It should be appreciated that operation of the various clutches (e.g., the forward directional clutch 52, the reverse directional clutch 54, and clutches R1, R2, R3 and R4) may be automatically controlled by the controller 44 using suitable actuators 62 (e.g., hydraulic pistons) communicatively coupled to the controller 44 via suitable communicative links 46.

The controller 44 may also be communicatively coupled to a swash plate actuator 64 for automatically controlling the angle of the swash plate of the pump 36. For example, the actuator 64 may be configured to move the swash plate across a range of angles in response to control signals received from the controller 44. In addition, the controller 44 may be coupled to any number of sensors for monitoring the various operating parameters of the transmission 24 including, but not limited to, pressure transducers or sensors 66 for sensing the pressure within the conduits 38 connecting the pump 36 to the motor 40 and/or for sensing the pressure of the hydraulic fluid within the various clutches of the transmission 24, speed sensors 68 for sensing speeds of the various shafts of the transmission 24, temperature sensors for sensing the temperature of one or more fluids within the transmission 24 and/or any other suitable sensors. Similarly, the controller 44 may also be connected to the engine 22 (e.g., a speed governor of the engine 22) for receiving engine speed data and other information therefrom.

Additionally, as shown in FIG. 2, the controller 44 may also be communicatively coupled to the operator-controlled input device(s) 20, 21 positioned within the cab 18 via a suitable communicative link 46. For example, the controller 44 may be coupled to the FRNP lever 20, the clutch pedal 21 and/or any other suitable input device of the vehicle (e.g., the speed control lever or pedal, the engine throttle lever, the neutral button and/or any other suitable lever, pedal, button or control panel of the vehicle 10).

During operation, the transmission 24 may be operated to have a combined hydrostatic and mechanical power flow by engaging the reverse directional clutch 54 to the power planetary power unit 32 via gears N1, N3, N5 and N7, or engaging the forward directional clutch 52 to power the power planetary power unit 32 via gears N1, N8, and N2. Alternatively, the transmission 44 may be operated to have a pure hydrostatic power flow by disengaging both of the directional clutches 52, 54. Regardless, the transmission 24 may provide a seamless transition between ranges to provide work/road configurations as desired. In particular, speed changes from zero to the maximum speed within each speed range of the transmission 24 may be achieved in a smooth and continuous manner by automatically changing the swash plate angle of the pump 36 via control signals transmitted from the controller 44. For each speed range, substantially the full range of travel of the swash plate may be used. For example, in several embodiments, the swash plate may be at one end of its range of travel for zero speed within a specific speed range, may be at the other end of its range of travel for the maximum speed of that speed range and may be at a zero tilt or neutral position within its range of travel for an intermediate speed of that same speed range.

Referring still to FIG. 2, the transmission 24 may also include a parking brake 70 operably positioned on the load shaft 56. In several embodiments, the parking brake 70 may be communicatively coupled to the controller 44 (via a suitable communicative link 46) for automatic control thereof. For example, the controller 44 may be configured to proportionally or gradually engage the parking brake 70 as well as gradually release or disengage the parking brake 70. In such embodiments, the pressure of the hydraulic fluid supplied to the parking brake 70 may be controlled using an automatic valve (e.g., a proportional pressure reducing valve) configured to be operated via control signals transmitted from the controller 44. As is generally understood, the parking brake pressure may be inversely related to the parking brake torque. Thus, contrary to the various clutches of the transmission 24, the parking brake 70 may be designed such that it is engaged when the pressure within the brake 70 is reduced and disengaged when the pressure within the brake 70 is increased.

In addition, for operation when the controller 44 is not powered or is not properly functioning, the parking brake 70 may also be configured to be engaged using a separate means. For instance, the parking brake 70 may be spring applied or may include any other suitable biasing means configured to bias the parking brake 70 into engagement. Alternatively, the parking brake 70 may include a suitable mechanical means for engaging the brake 70 when the controller 44 is not powered or is not properly functioning. Moreover, a means may be provided to store pressurized hydraulic fluid in the event the engine 22 stalls so that the parking brake 70 may remain released and/or may be applied and released several times if needed to control the vehicle 10 until the engine 22 can be restarted. Additionally, other means (e.g., hand pump) may be provided to disengage the parking brake 70 if there is a fault and no stored pressurized hydraulic fluid is left within the system.

It should be appreciated that the configuration of the transmission 24 shown in FIG. 2 simply illustrates one example of a suitable transmission with which the disclosed system and method may be utilized. Thus, one of ordinary skill in the art should appreciate that application of the present subject matter need not be limited to the particular transmission 24 shown in FIG. 2, but, rather, the present subject matter may be advantageously used with various types/configurations of transmissions. For example, in addition to a continuously variable transmission, aspects of the disclosed system and method may also be advantageously applied to allow for performance of an automatic calibration of the clutches within a power shift transmission or any other suitable transmission type.

Figure 3:
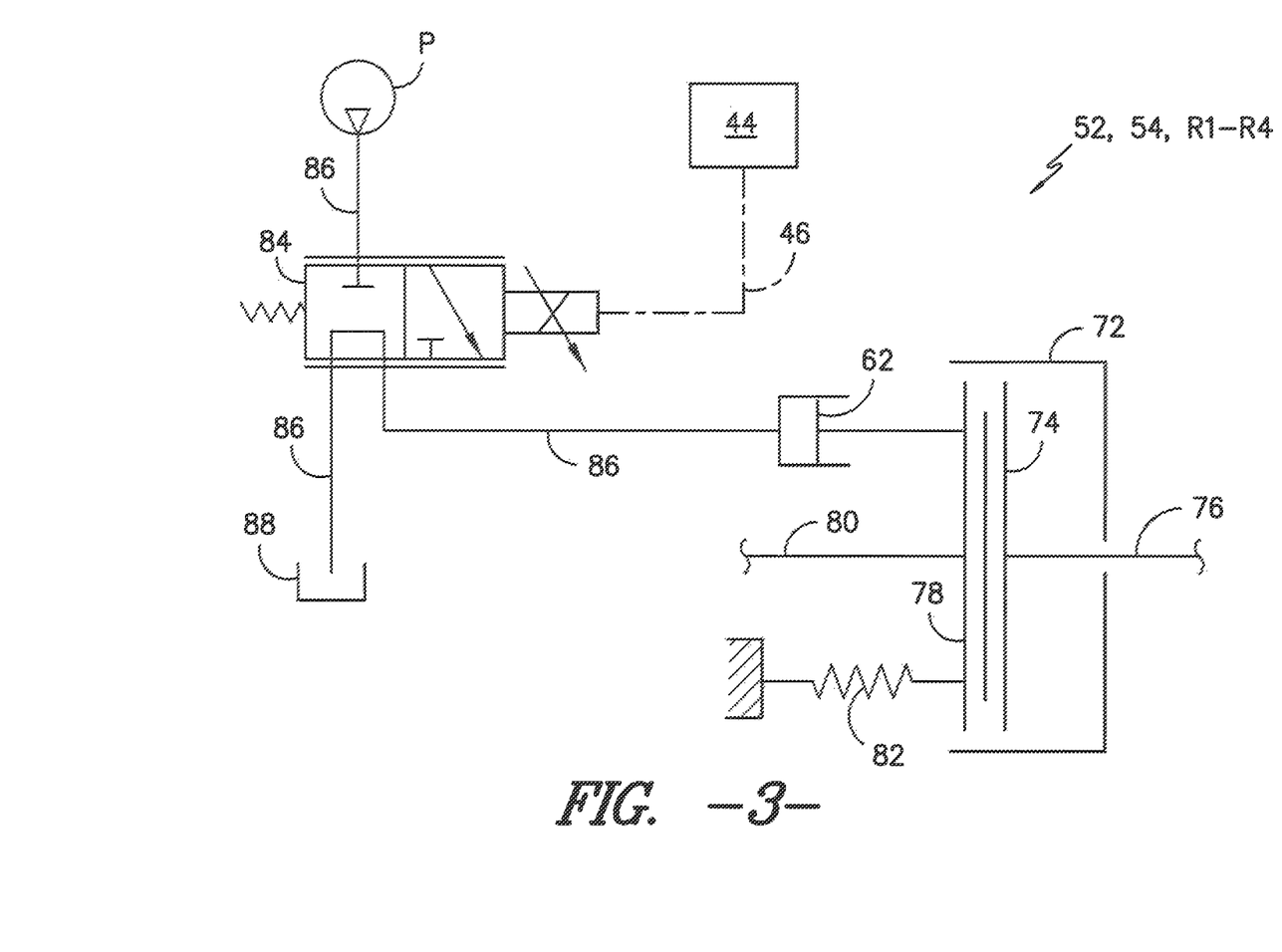
FIG. 3 illustrates a schematic view of one embodiment of a suitable clutch configuration that may be used with the clutches of the transmission shown in FIG. 2.

Referring now to FIG. 3, a schematic diagram of one embodiment of a hydraulically operated clutch is illustrated in accordance with aspects of the present subject matter. The clutch is generally representative of a suitable configuration for the directional clutches 52 and 54, and the range clutches R1-R4 of the transmission 24 described above with reference to FIG. 2.

As shown, the hydraulically operated clutch may include an enclosure or can 72 that contains one or more clutch plates 74 coupled to an output shaft 76 and one or more clutch plates 78 coupled to an input shaft 80. In addition, the clutch may include both a clutch spring(s) 82 configured to hold the clutch plates 74, 78 apart and a fluid operated actuator (e.g., actuator 62 described above with reference to FIG. 2) configured to press the clutch plates 74, 78 together to engage the clutch.

Moreover, as shown in FIG. 3, pressurized fluid may be supplied to the actuator 62 by a proportional solenoid pressure reducing valve 84 (e.g., via fluid lines 86). The valve 84 may be configured to receive the pressurized fluid from a pump P of the vehicle 10 and may also be in fluid communication with a fluid tank 88 of the vehicle 10. As is generally understood, operation of the valve 84 may be automatically controlled by the vehicle controller 44 through the transmission of suitable control signals via the communication links 46. Each control signal may generally correspond to a current command associated with a specific electrical current value, which, in turn, may be directly proportional to the pressure of the hydraulic fluid supplied to the actuator 62 from the valve 84. Thus, by varying the current command, the controller 44 may directly control the fluid pressure supplied to the actuator 62 and, thus, control engagement/disengagement of the clutch.

Figure 4:
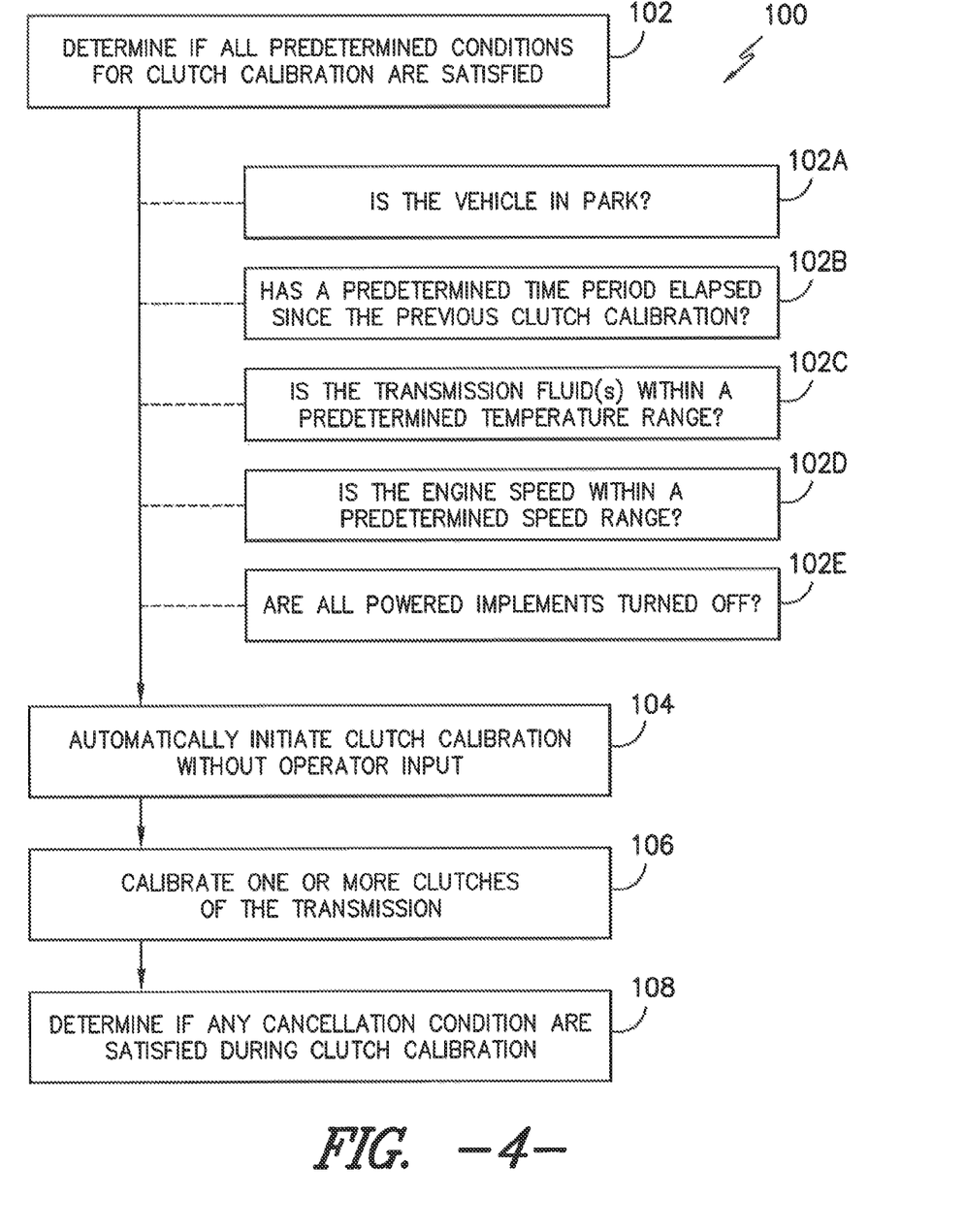
FIG. 4 illustrates a flow diagram of one embodiment of a method thr automatically calibrating the clutches within a transmission of a work vehicle.

Referring now to FIG. 4, a flow diagram of one embodiment of a method 100 for automatically calibrating the clutches of a work vehicle transmission is illustrated in accordance with aspects of the present subject. In general, the method 100 will be described with reference to the continuously variable transmission 24 and clutches 52, 54, R1-R4 shown and described above with reference to FIGS. 2 and 3. However, it should be appreciated by those of ordinary skill in the art that the disclosed method 100 may be utilized to automatically calibrate the clutches of any other suitable transmission. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at 102, the method 100 includes determining if all the predetermined conditions required for initiating an automatic clutch calibration are satisfied. Specifically, as indicated above, the disclosed calibration process is configured to be performed automatically by the vehicle's controller 44 without requiring any operator input or interaction. Thus, prior to initiating the actual calibration process, the controller 44 may be configured to verify that various conditions are satisfied to ensure that a safe and accurate clutch calibration can be performed.

For example, at 102A, the controller 44 may be configured to verify that the work vehicle 10 is in park. To make such a determination, the controller may, for instance, be configured to confirm the position of the FNRP lever 20 of the vehicle 10. Specifically, the controller 44 may be communicatively coupled to a suitable sensor(s) that provides an indication of whether the FNRP lever 20 is engaged in the "Forward" position, the "Neutral" position, the "Reverse" position or the "Park" position. If the FNRP lever 20 is in engaged in the "Park" position, it may be determined that the vehicle 10 is in park and it may be appropriate to initiate the clutch calibration (assuming any other required conditions are satisfied). In addition to verifying the position of the FRNP lever 20, the controller 44 may also be configured to verify that the work vehicle 10 is not currently in motion. For instance, the controller 44 may be communicatively coupled to a suitable sensor(s) (e.g., a wheel or shaft speed sensor(s)) that provides an indication of the ground speed of the vehicle 10 or the output speed of the transmission 24.

Additionally, at 102B, the controller 44 may be configured to verify that a predetermined time period has elapsed since one or more of the clutches 52, 54, R1-R4 of the transmission 24 were previously calibrated. Specifically, in several embodiments, the automatic calibration may only be initiated by the controller 44 if it is determined that the clutches 52, 54, R1-R4 have not been calibrated within a given time period. In such embodiments, the predetermined time period may generally be selected based on the desired frequency for performing the disclosed calibration method 100. For instance, the predetermined time period may correspond to a given amount of engine hours for the work vehicle 10 (e.g., a time period ranging from 20 to 50 engine hours) or a fixed amount of calendar time (e.g., once per week). It should be appreciated that the predetermined time period may begin to run from any previous clutch calibration, such as a previous calibration performed in accordance with the methods described herein and/or any other suitable calibration (e.g., a previous service-initiated clutch calibration).

By selecting an appropriate time period between clutch calibrations, the performance of the transmission 24 may be enhanced via the calibration while minimizing any operator inconvenience. For example, an operator may be unwilling to allow a clutch calibration to be performed each time that his/her work vehicle 10 is powered up or down. However, by spacing each clutch calibration apart from previous calibrations by a given time period, the performance of the calibrations may be less intrusive. Additionally, as will be described below, even though a clutch calibration is initiated due to the passing of the predetermined time period (and due to any other required conditions being satisfied), the clutch calibration may still be terminated. As a result, if the operator does not desire for the clutch calibration to be performed at a particular time or if the work vehicle is simply not maintained in park under the appropriate conditions for performing the calibration process, the calibration may be cancelled. In such event, the controller 44 may be configured to wait until the next key cycle before attempting to initiate another automatic clutch calibration (assuming all predetermined conditions are satisfied at that later time).

Referring still to FIG. 4, at 102C, the controller 44 may be configured to verify that the temperature(s) of one or more of the fluids contained within the transmission 24 are within a predetermined temperature range. For example, in several embodiments, the controller 44 may be configured to verify that the oil temperature within the transmission 24 is within a suitable temperature range, such as an oil temperature ranging from about 60 degrees Celsius (° C.) to about 90° C. or from about 65° C. to about 85° C. and any other subranges therebetween. As is generally understood, by maintaining the oil temperature within a given range for each clutch calibration, a more repeatable and accurate calibration may be performed. It should be appreciated that the oil temperature may be monitored using one or more temperature sensors communicatively coupled to the controller 44 (e.g., sensors positioned at and/or adjacent to the fluid valves and/or the oil sump).

Additionally, at 102D, the controller 44 may be configured to verify that the engine speed of the vehicle 10 is within a predetermined speed range. For instance, in several embodiments, the clutch calibration may be initiated when the engine 22 is operating at an engine speed ranging from about 800 RPM to about 1000 RPM, such as from about 850 RPM to about 950 RPM or from about 875 RPM to about 925 RPM and any other subranges therebetween. It should be appreciated that the controller 44 may be configured to monitor the engine speed via signals received from one or more speed sensors, such as an engine speed sensor(s) associated with the speed governor of the engine 22.

It should also be appreciated that, when selecting the predetermined speed range, it may be desirable for the engine speed used when performing the disclosed automatic clutch calibration to be the same as or similar to the engine speed used when performing any other suitable clutch calibration (e.g., a service-initiated clutch calibration). For instance, the controller 44 may be configured to control the engine speed to a specific RPM value (e.g., 900 RPM) regardless of the type of calibration being performed. By utilizing the same or a similar engine speed for each clutch calibration, a more repeatable and accurate calibration may be performed. In contrast, if the engine speed is varied significantly during a calibration, it becomes more difficult to precisely determine the torque within the clutch, which can lead to an inaccurate calibration.

Moreover, at 102E, the controller 44 may be configured to verify that all powered implements associated with the work vehicle 10 are turned off prior to the initiation of any automatic clutch calibration. For instance, in several embodiments, the controller 44 may verify that any front and/or rear PTOs associated with the vehicle 100 are turned off. In addition, the controller 44 may be configured to verify that any components associated with the powered implements, such as any electro-hydraulic remote (EHR) valves, are also shut down prior to the initiation of any calibration. As is generally understood, the loads on the vehicle engine 22 and/or transmission 24 may vary significantly when powered implements are turned on. Thus, by ensuring that all powered implements are turned off during each clutch calibration, a more repeatable and accurate calibration may be performed.

It should be appreciated that the conditions described above with reference to FIG. 4 (i.e., conditions 102A-102E) are simply provided as examples of suitable predetermined conditions that may be required for initiating an automatic clutch calibration in accordance with disclosure provided herein. Thus, one of ordinary skill in the art should readily appreciate that any other suitable predetermined conditions may also be required to be satisfied prior to the initiation of an automatic calibration. For instance, the controller 44 may also be configured to verity that no faults are present within the system (e.g., by verifying that no sensor faults have been identified) and/or to verify that the clutch pedal 21 has not been depressed by the operator (e.g., by monitoring signals received from a sensor(s) associated with the clutch pedal 21). As another example, the controller 44 may also be configured to verify that the operator is properly seated inside the operator's cab 18. Similarly, it should be appreciated that the specific combination of conditions described above with reference to FIG. 3 (i.e., conditions 102A-102E) is simply provided as one example of a suitable combination of predetermined conditions that may be required for initiating an automatic clutch calibration. In other embodiments, any other suitable combination of predetermined conditions may be required to be satisfied prior to the initiation of an automatic calibration.

It should also be appreciated that, in several embodiments, the controller 44 may only be allowed to initiate an automatic clutch calibration within a given time period (e.g., 1 to 4 seconds) after the work vehicle 10 is placed in park. During this time period, power to the range clutches (e.g., clutches R1-R4) may remain turned on while the controller 44 is verifying whether or not all the predetermined conditions are satisfied. If it is determined that all of the conditions are not satisfied within the time period, power to the range clutches may be turned off since an automatic clutch calibration will not be initiated. However, if all of the predetermined conditions are satisfied within the time period, power to the range clutches will only be turned off once the automatic clutch calibration is completed.

Referring still to FIG. 4, at 104, the method 100 includes automatically initiating a clutch calibration without requiring any operator input or interaction. Specifically, as indicated above, the controller 44 may be configured to automatically initiate the clutch calibration process when all of the predetermined conditions for performing a clutch calibration are satisfied (e.g., conditions 102A-102E). Given the automatic nature of the disclosed calibration method 100, a suitable notification may be provided to the operator when the clutch calibration is initiated. For instance, in one embodiment, a suitable message window may be displayed to the operator indicating that an automatic clutch calibration is in progress.

Additionally, at 106, the method 100 includes actually calibrating one or more of the clutches of the transmission 24. Specifically, in accordance with several aspects of the present subject matter, the controller 44 may only be configured to calibration a portion of the clutches contained within the transmission 24 in order to reduce the amount of time required to complete the entire calibration process. For instance, in one embodiment, only the forward directional clutch 52, the reverse directional clutch 54 and the first range clutch R1 may be calibrated while performing the disclosed method 100. However, in other embodiments, any other combination of clutches (including all of the clutches) may be calibrated in accordance with aspects of the present subject matter. The actual process for calibrating each clutch will generally be described below with reference to FIG. 5.

Referring still to FIG. 4, at 108, the method 100 includes determining if any cancellation conditions are satisfied during the performance of the clutch calibration. Specifically, in several embodiments, the calibration process may be automatically terminated or cancelled if the controller 44 determines that one or more specific cancellation conditions are satisfied. For instance, several of the cancellation conditions may relate to operator actions that can result in a change in the operation of the vehicle 10 in a manner that may be detrimental to the performance of an accurate and/or safe clutch calibration, such as by the operator moving the FNRP lever 20 away from the "Park" position, depressing the clutch pedal 21, depressing a speed control pedal of the vehicle 10, moving a speed control lever of the vehicle 10, moving a throttle lever of the vehicle 10, pressing a neutral button of the vehicle 10 and/or manipulating any other suitable input device that may impact the clutch calibration. As another example, the clutch calibration may be required to be cancelled if the operator does not remain seated within the operator's cab 18 during the entire calibration process. Additionally, the clutch calibration may be automatically cancelled if the controller 44 detects any vehicle motion during the calibration process (or vehicle motion beyond a given threshold).

By providing the cancellation conditions, it can be ensured that the calibration process is only performed when operating conditions are conducive to an efficient, accurate and safe clutch calibration. In addition, the cancellation conditions may also provide a means for the operator to abort or otherwise cancel the clutch process calibration if he/she does not desire for a clutch calibration to be performed at that time. For instance, if the operator needs to immediately use the work vehicle 10, he/she may move the FNRP lever 21 out of park or manipulate any other appropriate pedal, lever or other input device to cancel the calibration process.

It should be appreciated that instances may arise in which, due to the predetermined conditions required for calibration initiation, long periods of time may pass without an automatic clutch calibration being performed by the controller 44. For instance, an operator may operate his/her vehicle in a manner that does now allow one or more of the predetermined conditions to be satisfied (e.g., due to the fact that the operator leaves powered implements turned on when shutting down the vehicle 10). In such instance, the controller 44 may be configured to notify the operator (e.g., via a message window) that an automatic clutch calibration is recommended or required.

Figure 5:
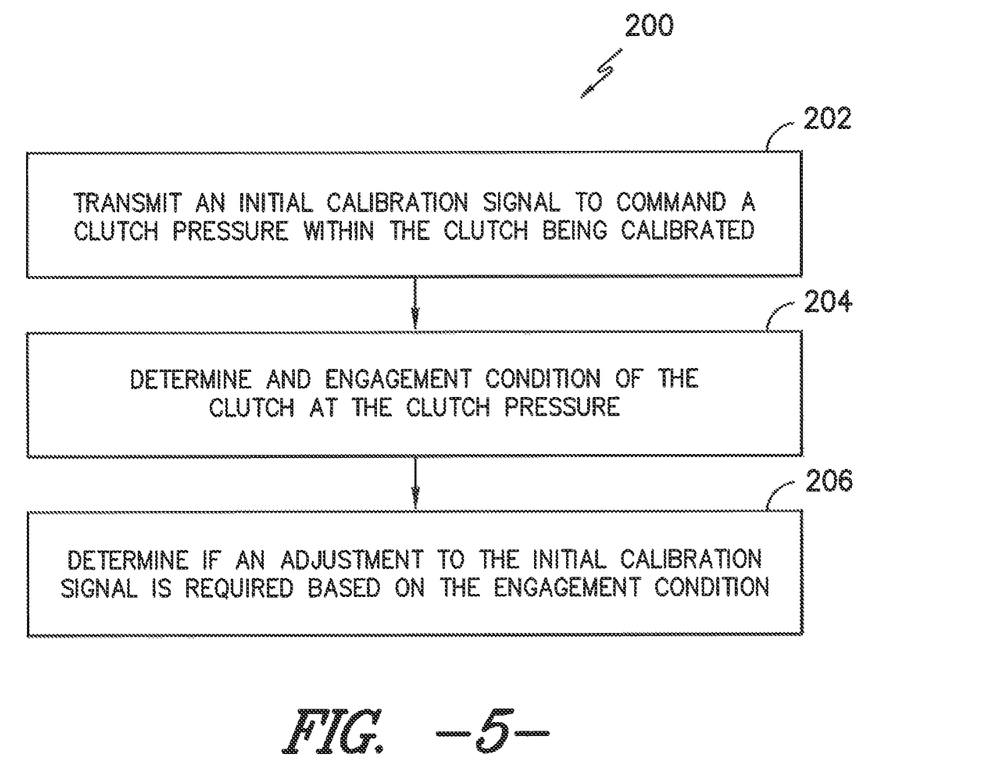
FIG. 5 illustrates a flow diagram of one embodiment of a method for calibrating the individual clutches of a work vehicle transmission.

Referring now to FIG. 5, a flow diagram of one embodiment of a method 200 for calibrating individual transmission clutches is illustrated in accordance with aspects of the present subject. In general, the method 200 will be described with reference to performing the calibration process included within the method 100 of FIG. 4 (e.g., method element 106). However, it should be appreciated by those of ordinary skill in the art that the disclosed method 200 may be utilized to calibrate individual clutches in accordance with any other suitable calibration process. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at 202, the method 200 includes transmitting an initial calibration signal to command a clutch pressure within the clutch being calibrated (e.g., the forward directional clutch 52, the reverse directional clutch 54 or the first range clutch R1). As indicated above, a clutch pressure may be commanded by transmitting a suitable current command to the clutch valve 84 (FIG. 3), with the commanded current value being directly proportional to the resulting clutch pressure.

In order to reduce the amount of time required to complete the clutch calibration, the initial current command transmitted from the controller 44 to the clutch valve 84 may, in several embodiments, correspond to the final current command obtained from the preceding calibration performed on the clutch. Specifically, for each calibration performed on a given clutch, the final current command determined via the calibration process may be stored within the controller's memory. Thereafter, this stored current command may then be used as the initial current command for the next calibration performed on the clutch. As a result, unlike conventional calibration methods that utilize the same initial current command for every clutch calibration performed (e.g., a predetermined baseline current command), the disclosed method 200 may be configured to initiate the calibration process using the previously determined current command, which may allow the controller 44 to quickly identify whether the current needs to be adjusted up or down relative to the previous command.

At 204, the method 200 includes determining an engagement condition of the clutch at the clutch pressure associated with initial calibration signal (i.e., the initial current command). Specifically, in several embodiments, the controller 44 may be configured to determine if the current commanded via the initial calibration signal results in a clutch pressure that is too low or too high for clutch engagement. For example, if the clutch fails to engage at the commanded pressure, then the current command transmitted by the controller 44 was too low and will need to be increased. Similarly, if the clutch engages at the commanded pressure to a greater extent than what is required for initial engagement of the clutch plates 74, 78, then the current command transmitted by the controller 44 was too high and will need to be decreased.

In general, it should be appreciated that the engagement condition of the clutch (i.e., whether and to what extent the clutch actually engaged) may be determined using any suitable means and/or methodology known in the art. However, in several embodiments of the present subject matter, such condition of the clutch may be determined by analyzing a change in the pressure within the hydrostatic power unit 30 of the transmission 24. For instance, as indicated above, the controller 44 may be communicatively coupled to one or more pressure sensors 66 configured to monitor the pressure within the hydrostatic power unit 30, such as by monitoring the fluid pressure within one or more of the fluid conduits 38 connecting the pump 36 to the motor 40. In such an embodiment, the pressure within the hydrostatic power unit 30 may be correlated to the clutch torque. For example, when a clutch is not engaged, the pressure within the hydrostatic power unit 30 (or a differential pressure across the unit 30) may be equal to a baseline pressure (or a baseline pressure differential). However, as the clutch is engaged, the pressure within the hydrostatic power unit 30 (or the pressure differential across such unit 30) may vary with increasing clutch torques. Accordingly, by monitoring the pressure within the hydrostatic drive unit 30, the controller 44 may be configured to determine when and to what extent a clutch has engaged and, thus, may determine if the current command transmitted to the clutch valve 84 was too high or too low.

Referring still to FIG. 5, at 206, the method 200 includes determining if an adjustment to the initial calibration signal (e.g., the initial current command) is required based on the engagement condition of the clutch. Specifically, if the controller 44 determines that the clutch pressure associated with the initial current command is appropriate to properly engage the clutch, the current command may be stored as the final current command for such clutch and the calibration process may be terminated. However, if the controller 44 determines that the clutch pressure was not appropriate to properly engage the clutch (e.g., by being too high or too low), the clutch may be fully dumped and an adjusted current command may be transmitted to the clutch valve 72 to command a new clutch pressure within the clutch. For instance, if the initial current command was too low, the current command may be adjusted upward by a given step size or increment in order to increase the corresponding clutch pressure. Similarly, if the initial current command was too high, the current command may be adjusted downward by a given step size or increment in order to decrease the corresponding clutch pressure. Regardless, after adjusting the current command, the engagement condition of the clutch may again be analyzed to determine if the new clutch pressure is too high or too low. If necessary, this process may then be repeated (e.g., using a "divide and conquer" type approach) until an appropriate current command is determined that is suitable for properly engaging the clutch (or until a maximum current change limitation is reached). The final current command resulting from the calibration process may then be stored within the controller 44 and subsequently used as the current command for engaging the clutch during operation of the vehicle (as well as being used at the initial current command for the next automatic calibration performed on the clutch).

It should be appreciated that, when making adjustments to the current commands during calibration, conventional calibration techniques typically allow for relative large increases/decrease in the current to be made, which is often appropriate for service-initiated calibrations. However, when performing the automatic clutch calibration described herein, it may be desirable to limit both the step size allowed between successive current commands and the total magnitude that the current may be adjusted between the initial and final current commands in order to reduce the amount of time required to complete the calibration process as well as to prevent large adjustments that may substantially alter the performance of the vehicle 10. For instance, in several embodiments, the controller 44 may be limited to making step size changes in the current between successive calibration commands ranging from 0.5 milliamps (mA) to about 4 mA, such as from about 1 mA to about 3 mA or from about 1.5 mA to about 2.5 mA and any other subranges therebetween. Similarly, in several embodiments, the maximum current change that may be allowed between the initial current command and the final current command for the clutch calibration may range from about 2 mA to about 6 mA, such as from about 3 mA to about 5 mA or from about 3.5 mA to about 4.5 mA and any other subranges therebetween.

It should also be appreciated that, by limiting the maximum current change allowed during each clutch calibration, the controller 44 may not always be capable of determining the most appropriate current command for engaging a clutch in certain situations. For instance, if a clutch has been subjected to a significant amount of wear since its last calibration, the actual current change necessary to completely calibrate the clutch may exceed the maximum allowable current change. In such instance, the calibration process may be terminated when the maximum current change is reached and the final current command for resulting from such calibration (i.e., the initial current command plus or minus the maximum current change) may be stored within the controller 44. Thereafter, when the next automatic calibration is performed (e.g., after the predetermined time period has elapsed and all other conditions are satisfied), the controller 44 may utilize the previously stored final current command as the initial current command and may continue to make adjustments as necessary in order to further calibrate the clutch.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for automatically calibrating clutches within a transmission of a work vehicle, the method comprising:
   determining, with a computing device, whether a plurality of predetermined conditions are satisfied for performing a clutch calibration on a clutch of the transmission, wherein the plurality of predetermined conditions require that the work vehicle be in park and that a predetermined time period has elapsed since a previous clutch calibration was performed on the clutch;
   automatically initiating the clutch calibration without requiring operator input when the plurality of predetermined conditions are satisfied;
   performing the clutch calibration in order to calibrate the clutch by
      transmitting an initial current command to a clutch valve associated with the clutch to command a clutch pressure within the clutch; and
      determining an engagement condition of the clutch at the clutch pressure; and
   determining whether an adjustment of the initial current command is required based on the engagement condition of the clutch in order to obtain a final current command for the clutch calibration, and if required adjusting the initial current command up or down based on the engagement condition in order to obtain the final current command, wherein a total current adjustment made between the initial current command and the final current command is limited to a predetermined maximum current change.

2. The method of claim 1, wherein the transmission is a continuously variable transmission.

3. The method of claim 1, wherein the predetermined time period corresponds to one of a predetermined amount of engine hours of the work vehicle or a predetermined amount of calendar time.

4. The method of claim 1, wherein the plurality of predetermined conditions further require that an engine speed of the work vehicle fall within a predetermined speed range.

5. The method of claim 1, wherein the plurality of predetermined conditions further require that a fluid temperature of the transmission fall within a predetermined temperature range.

6. The method of claim 1, wherein the plurality of predetermined conditions further require that all powered implements of the work vehicle be turned off.

7. The method of claim 1, further comprising determining if a cancellation condition is satisfied during the performance of the clutch calibration.

8. The method of claim 7, further comprising automatically terminating the clutch calibration if the cancellation condition is satisfied.

9. The method of claim 7, wherein the cancellation condition corresponds to operator manipulation of an input device of the work vehicle.

10. The method of claim 1, wherein a current adjustment made between any successive current commands transmitted between the initial current command and the final current command is limited to a predetermined current step size.

11. A system for automatically calibrating work vehicle clutches, the system comprising:
a transmission including a clutch and a clutch valve associated with the clutch, the clutch valve being configured to regulate a clutch pressure of fluid supplied to a an actuator of the clutch, the actuator being configured to engage the clutch based on the clutch pressure; and
a controller commutatively coupled to the clutch valve, the controller being configured to:
determine whether a plurality of predetermined conditions are satisfied for performing a clutch calibration on the clutch, wherein the plurality of predetermined conditions require that the work vehicle be in park and that a predetermined time period has elapsed since a previous clutch calibration was performed on the clutch;
automatically initiate the clutch calibration without requiring operator input when the plurality of predetermined conditions are satisfied; and
perform the clutch calibration in order to calibrate the clutch, wherein the controller is subject to a step size limitation and a maximum current change limitation when making current adjustments during the performance of the clutch calibration.

12. The system of claim 11, wherein the transmission is a continuously variable transmission.

13. The system of claim 11, wherein the predetermined time period corresponds to one of a predetermined amount of engine hours of the work vehicle or a predetermined amount of calendar time.

14. The system of claim 11, wherein the plurality of predetermined conditions further require that an engine speed of the work vehicle fall within a predetermined speed range, that a fluid temperature of the transmission fall within a predetermined temperature range or that all powered implements of the work vehicle be turned off.

15. The system of claim 11, wherein the controller is further configured to automatically terminate the clutch calibration if a cancellation condition is satisfied during the performance of the clutch calibration.

* * * * *